[11] 3,572,891

| [72] | Inventor | Bruce Cam...<br>Harrisburg, |
|---|---|---|
| [21] | Appl. No. | 583,372 |
| [22] | Filed | Sept. 30, 1966 |
| [45] | Patented | Mar. 30, 1971 |
| [73] | Assignee | AMP Incorporated<br>Harrisburg, Pa. |

[54] TERMINATION MEMBER FOR FIBER OPTIC MEMBERS
8 Claims, 12 Drawing Figs.

| [52] | U.S. Cl. | 350/96, 29/517, 339/223 |
|---|---|---|
| [51] | Int. Cl. | G02b 5/16 |
| [50] | Field of Search | 350/96; 339/128, 223 |

[56] References Cited
UNITED STATES PATENTS

| 2,975,785 | 3/1961 | Sheldon | 350/96X |
|---|---|---|---|
| 3,181,110 | 4/1965 | Waters | 339/223 |
| 3,200,367 | 8/1965 | Blanchenot | 339/223X |
| ......... | 11/1966 | Wallace | (350/96)UX |

*Primary Examiner*—John K. Corbin
*Attorneys*—Curtis, Morris and Safford, Marshall M. Holcombe, William Hintze, William J. Keating, Frederick W. Raring, John R. Hopkins, Adrian J. La Rue and Jay L. Seitchik ABSTRACT: A termination member for terminating an end of fiber optic means comprises a first section and a second section interconnected by a bridge section. The first section is adapted to be secured onto stripped fiber optic elements of the fiber optic means and being formed into a desired geometric configuration thereby maintaining the stripped ends in a dense state within the first section and in alignment. The second section is adapted to be secured onto a covering member of the fiber optic means and it includes means to penetrate the covering member to secure the second section on the covering member. The sections are secured onto the stripped ends and covering member with a minimum of deformation to the fiber optic means to maintain the transmission characteristics of the fiber optic means at almost its original amount.

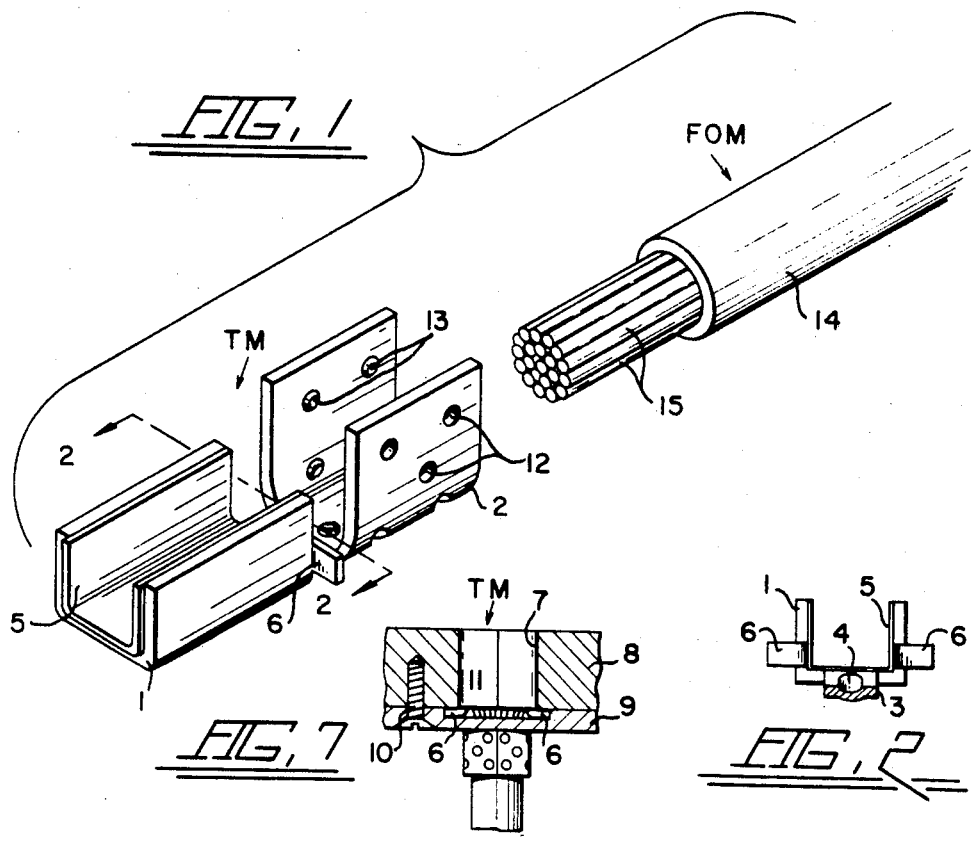
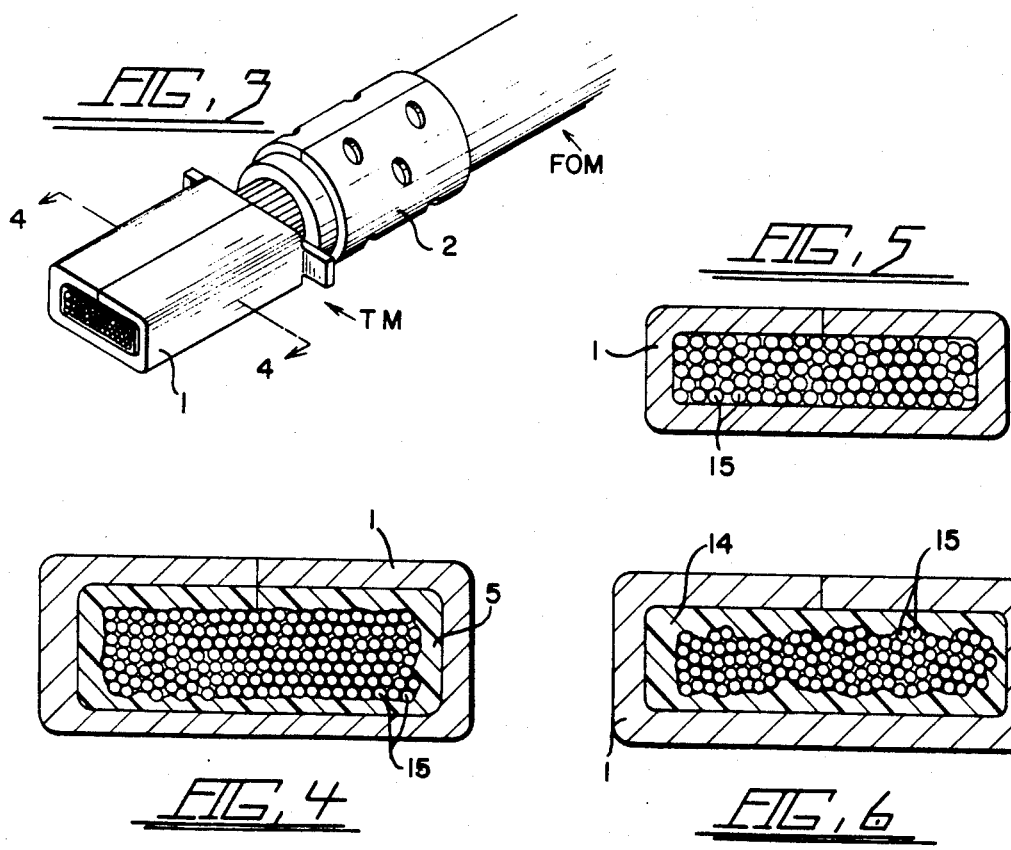

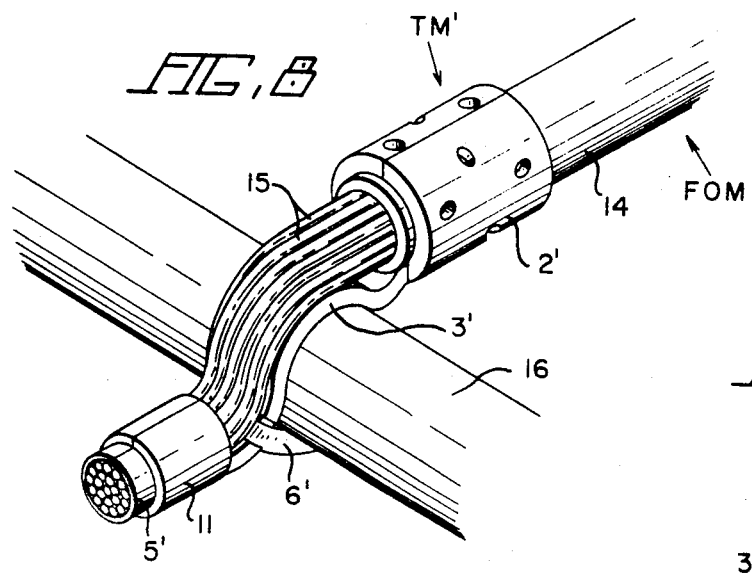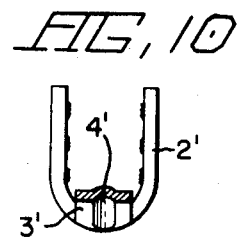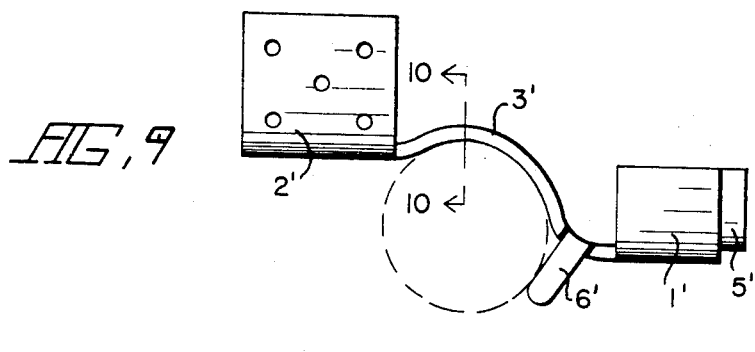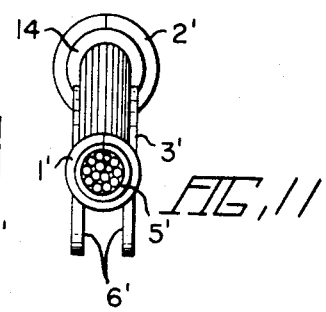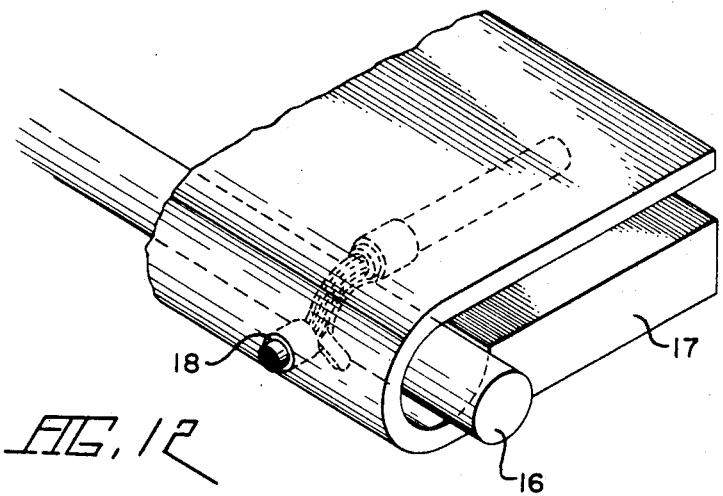

TERMINATION MEMBER FOR FIBER OPTIC MEMBERS

This invention relates to fiber optic members and more particularly to termination means to terminate fiber optic members.

Fiber optic members to transmit intelligence are presently in use. Termination of stripped ends of the fiber optic members is of utmost importance because of the necessity to maintain optimum transmission characteristics of the fiber optic members as well as the requirement to mount ends of the fiber optic members in a space of minimum cross-sectional area. It is also important to maintain the ends of the fiber optic elements in alignment and to form these ends into a desired geometrical configuration.

An object of the invention is to provide termination means to terminate stripped ends of fiber optic members.

Another object of the invention is the provision of termination means to terminate stripped ends of fiber optic members including means to provide strain relief means.

A further object is to provide termination means for fiber optic members which disposes the fiber optic elements in a dense and substantially uniform manner of desired geometrical configuration.

An additional object is the provision of liner means in the termination means to minimize any damage to the fiber optic elements during the crimping onto the stripped fiber optic elements.

A still further object is to provide a fiber optic termination means that maintains the ends of the fiber optic elements in alignment for effective operation capability.

Still an additional object of the invention is the provision of a fiber optic termination means to mount the fiber optic means on a shaft.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing and other objects are achieved by a preferred embodiment of a termination member for terminating an end of fiber optic means comprising a first section and a second section interconnected by a bridge section, the first section being securable onto stripped fiber optic elements of the fiber optic means and being formable into a desired geometric configuration thereby maintaining the stripped ends in a dense state within the first section and in alignment, the second section being securable onto a covering member of the fiber optic means and including means to penetrate the covering member to secure the second section on the covering member, the sections being secured onto the stripped ends and covering member with a minimum of deformation thereto to maintain the transmission characteristics of the fiber optic means at almost its original amount.

In the drawings:

FIG. 1 is an exploded perspective view of a termination member and a fiber optic member;

FIG. 2 is a view taken along lines 2-2 of FIG. 1;

FIG. 3 is a perspective view of the termination member secured in position on the fiber optic member;

FIG. 4 is a view taken along lines 4-4 of FIG. 3;

FIGS. 5 and 6 are views similar to FIG. 4 but of alternative embodiments;

FIG. 7 is a cross-sectional view of a mounting member for the termination member;

FIG. 8 is a perspective view of an alternative embodiment of the termination member;

FIG. 9 is a side elevational view of the termination member of FIG. 8 in an uncrimped condition;

FIG. 10 is a view taken along lines 10-10 of FIG. 9;

FIG. 11 is a front elevational view of the termination member of FIG. 8; and

FIG. 12 is a perspective view of the fiber optic assembly in position on a mounting member.

Turning now to the drawings and more particularly FIGS. 1 through 4, there is illustrated a termination member TM securable on fiber optic means FOM. The termination member is susceptible to mass production by automatic machinery and is conveniently formed by shaping a sheet metal blank or strip of a suitable material such as brass or the like in successive forming steps. The metal is sufficiently hard and resilient and has springlike characteristics, yet it is sufficiently malleable to permit crimping of the termination member onto the fiber optic means to effect an excellent mechanical connection therewith.

Termination member TM comprises a first section 1 and a second section 2. As can be discerned, sections 1 and 2 have a U-shaped configuration in cross section and these sections are interconnected by a bridge section 3 extending between the bights of sections 1 and 2 so that the axes of sections 1 and 2 are in alignment. Bridge section 3 has a groove 4 formed therein in order to increase the strength thereof. The preferred embodiment of the invention includes a liner 5 secured to the inner surface of section 1 and the characteristics of the material to form liner 5 will be discussed in greater detail hereinafter.

Lugs 6 extend outwardly from first section 1 and these lugs act as stop means to limit the movement of the termination member within an opening 7 of a mounting member 8. Opening 7 has a configuration conforming to the configuration of section 1. A plate 9 is secured to mounting member 8 via screw means 10 or the like and plate 9 has a recess 11 in which lugs 6 are disposed and an accurate recess (not shown) in which the part between sections 1 and 2 of the termination member are disposed. Of course, other ways to mount the termination member in a mounting member can be visualized. Thus, lugs 6 can be located on second section 2 or bridge section 3. Second section 2 includes openings 12 having inwardly-beveled sections 13 located on the inner surface of section 2 which are generally of a frustoconical configuration. Sections 13 may, however, be serrated or take any other suitable form to perform the intended function.

Fiber optic member FOM comprises a covering member 14 of compressible or resilient plastic surrounding fiber optic elements 15 made from any suitable light transmitting material and the number of fiber optic elements depends upon the amount of light to be transmitted. Each of the fiber optic elements is surrounded with a coating of material having reflecting characteristics so as to transmit the light therealong. The fiber optic members are of the type manufactured by E. I. du Pont De Nemours and Co. under the trademark CROFON. The fiber optic members are flexible so that in bending the fiber optic members to accommodate a desired situation, the fiber optic elements move relative to each other, and, if the ends of the fiber optic members are not properly terminated, the ends of the fiber optic elements extend outwardly from the ends of the covering member in an irregular manner thereby resulting in an improper alignment for the ends of the fiber optic elements. The fiber optic members are therefore most effective when the ends of all the fiber optic elements are located in the same or substantially the same plane. As can be discerned from FIG. 1, the fiber optic member has been stripped to bear a portion of the ends of the fiber optic elements and the stripped fiber optic member is placed within the termination member with the fiber optic elements disposed within section 1 while covering member 14 is disposed within section 2. The U-shaped configuration of sections 1 and 2 makes it easy for the stripped fiber optic member to be placed within the termination member; however, the termination member can be formed in any other desirable manner so long as the fiber optic member can be inserted therewithin.

With the fiber optic member in position within the termination member, the termination member is subjected to a crimping operation by crimping dies (not shown) to crimp the termination member onto the fiber optic member. The termination member is crimped onto the fiber optic member in accordance with the disclosure of U.S. Pat. Application, Ser. No. 557,797, filed Jun. 15, 1966, now U.S. Pat. No. 3,517,981, assigned to the same assignee as the present application so as not to restrict the transmission characteristics of the fiber optic member.

The crimping dies form section 1 into a rectangular configuration and section 2 into a circular configuration, but it is to be understood that these sections can be formed into other geometrical configurations as desired to accommodate a desired purpose. Thus, the fiber optic elements are collected in a dense and substantially uniform manner of desired geometrical configuration. The reason for crimping section 1 onto fiber optic elements 15 is to conform the fiber optic elements to a desired geometrical configuration as well as to maintain the cross-sectional area of the desired geometrical configuration within predetermined parameters which would not be obtained if section 1 were crimped onto covering member 14 as illustrated in FIG. 6 which could be a desired termination in the case of cross-sectional areas that are not to be substantially uniform.

As can be observed from FIG. 4, fiber optic elements 15 are densely packed within section 1 and liner 5 so that the cross-sectional configuration of the terminated fiber optic elements within section 1 defines a substantially uniform cross-sectional area to serve, for example, as a read-out means for reading out punched card information on a data card. In such a case or in other cases in which the cross-sectional configuration of the end of the fiber optic elements is important, the present invention accomplishes this purpose.

The material of liner 5 is formed from a material of such a consistency so as to collect fiber optic elements 15 in a dense manner and in a desired configuration without subjecting the fiber optic elements to any damage that would impair the light transmitting characteristics thereof. An example of such a material is polyvinyl chloride but other materials can, of course, be utilized.

As section 2 is being crimped onto covering member 14, inwardly beveled sections 13 penetrate the covering member so as to securely position the termination member on the fiber optic member. Thus, section 2 defines a strain relief means for the termination member. In the event that the fiber optic means is not to be subjected to strains, section 1 with liner 5 can be used to terminate the stripped fiber optic member and section 2 can be eliminated.

Liner 5 serves to provide protection for the fiber optic elements as well as to aid in forming the fiber optic elements into a desired geometrical configuration. The liner is therefore essential if the fiber optic member is to be used in operations requiring high reliability. If the operation does not require exacting characteristics, liner 5 can be eliminated and section 1 can be crimped onto fiber optic elements 15 as illustrated in FIG. 5 but in a careful manner so as not to damage the fiber optic elements.

FIGS. 8 through 12 illustrate termination member TM' which is an embodiment of termination member TM. Termination member TM' is similar to termination member TM with a section 1' and liner 5' crimped onto fiber optic elements 15 and section 2' crimped onto covering member 14 of the fiber optic member FOM. Bridge section 3' has an accurate configuration so as to be mounted onto a shaft 16 of a tape reader head 17 and the axes of section 1' and 2' are disposed parallel to each other but these sections may be disposed at any angular disposition with respect to each other.

Bridge section 3' also has a groove 4' disposed therein to give strength to the bridge section. Bridge section 3' has lugs 6' to engage shaft 16 so as to hold the termination member TM' in position within tape reader head 17. As can be discerned, a part of liner 5' extends outwardly from section 1' and this part is disposed within an opening 18 within head 17 so that the end of the fiber optic elements are exposed exteriorly of head 17 in order to receive light from a source or to transmit light from a source. The liner and ends of the fiber optic elements may terminate at the end of section 1'. The fiber optic elements are terminated in termination member TM' so as to obtain a sharper bend of the fiber optic elements around a mounting member which would be difficult to obtain with covering member 14 extending between section 1' and 2'. Bridge section 3' also acts as a guide for the fiber optic elements as well as protection therefor.

As can be discerned, there has been described a novel and unique termination member for terminating the stripped end of a fiber optic member in order to collect the fiber optic elements in a dense manner and to form the ends of the fiber optic elements in a desired geometrical configuration.

It will, therefore, be appreciated that the aforementioned and other desirable objects have been achieved; however, it should be emphasized that the particular embodiments of the invention, which are shown and described herein, are intended as merely illustrative and not as restrictive of the invention.

I claim:

1. A terminal for a bundle of elongated fiber optic elements in which said bundle is provided with a covering thereon having one end spaced from one end of the bundle of elements to leave an uncovered marginal end portion, said terminal comprising first means for securely embracing the covering adjacent its one end and including means for penetrating only said covering, second means spaced from said first means for encompassing and compacting the elements of said bundle, at its uncovered marginal end portion, into a predetermined geometric configuration in which the elements are in alignment and substantially undeformed in order to maintain their original light transmission characteristics, said second means being open at its outer end to expose the ends of the fiber optic elements which are adapted to terminate adjacent said outer end, and bridging means rigidly interconnecting said first and second means.

2. A terminal according to claim 1 in which the second means comprises a metallic outer layer and an inner nonmetallic layer.

3. A terminal according to claim 1 including a plurality of lugs extending from one of the first and second means.

4. A terminal according to claim 1 in which said means for penetrating the covering includes beveled protrusions on said first means.

5. A terminal according to claim 1 in which said first and second means are not in alignment, said bridging means being arcuately shaped and in supporting engagement with the bundle.

6. A terminal according to claim 1 in which said first means is circular in cross section and said second means is rectangular in cross section.

7. A terminal according to claim 1 in which the first and second means are circular in cross section.

8. A terminal according to claim 1 in which the second means comprises a bottom portion for engagement with a part of the bundle and a pair of confronting, bendable side portions adapted to be bent about the remaining part of the bundle.